United States Patent [19]

Forestier et al.

[11] Patent Number: 4,584,576
[45] Date of Patent: Apr. 22, 1986

[54] RINGING SIGNAL GENERATOR

[75] Inventors: Alain Forestier, Ploubezre; Philippe Fenaux, Sceaux, both of France

[73] Assignee: Telecommunications Radioelectriques et Telephoniques T.R.T., Paris, France

[21] Appl. No.: 545,793

[22] Filed: Oct. 26, 1983

[30] Foreign Application Priority Data

Oct. 27, 1982 [FR] France ............................ 82 17979

[51] Int. Cl.[4] ................ H04Q 9/00; H04M 3/02; H04M 1/00
[52] U.S. Cl. ..................... 340/825.38; 179/18 HB; 179/84 T
[58] Field of Search ............... 340/825.38; 179/84 T, 179/17 E, 18 HB, 51 AA, 175.2 B, 84 R

[56] References Cited

U.S. PATENT DOCUMENTS

| | | | |
|---|---|---|---|
| 3,767,857 | 10/1973 | Colas et al. | 179/18 HB |
| 4,270,028 | 5/1981 | Young | 179/17 E |
| 4,310,728 | 1/1982 | Dumont | 179/18 HB |
| 4,370,526 | 1/1983 | Schoofs et al. | 179/51 AA |
| 4,406,004 | 9/1983 | Hall et al. | 179/18 HB |

FOREIGN PATENT DOCUMENTS 57-41068A 3/1982 Japan .

Primary Examiner—Donald J. Yusko
Attorney, Agent, or Firm—Thomas A. Briody; William J. Streeter; Leroy Eason

[57] ABSTRACT

D.C.-fed ringing signal generator for a group of subscriber lines comprises a cascade arrangement of a digital signal generator controllable by a control signal to produce a signal corresponding either to the ringing signal or to a signal having zero value,
a digital-to-analog converter,
a capacitively-coupled class-A amplifier, and
a direct-coupled class-B symmetrical power amplifier to produce the output signal of the ringing signal generator.

6 Claims, 1 Drawing Figure

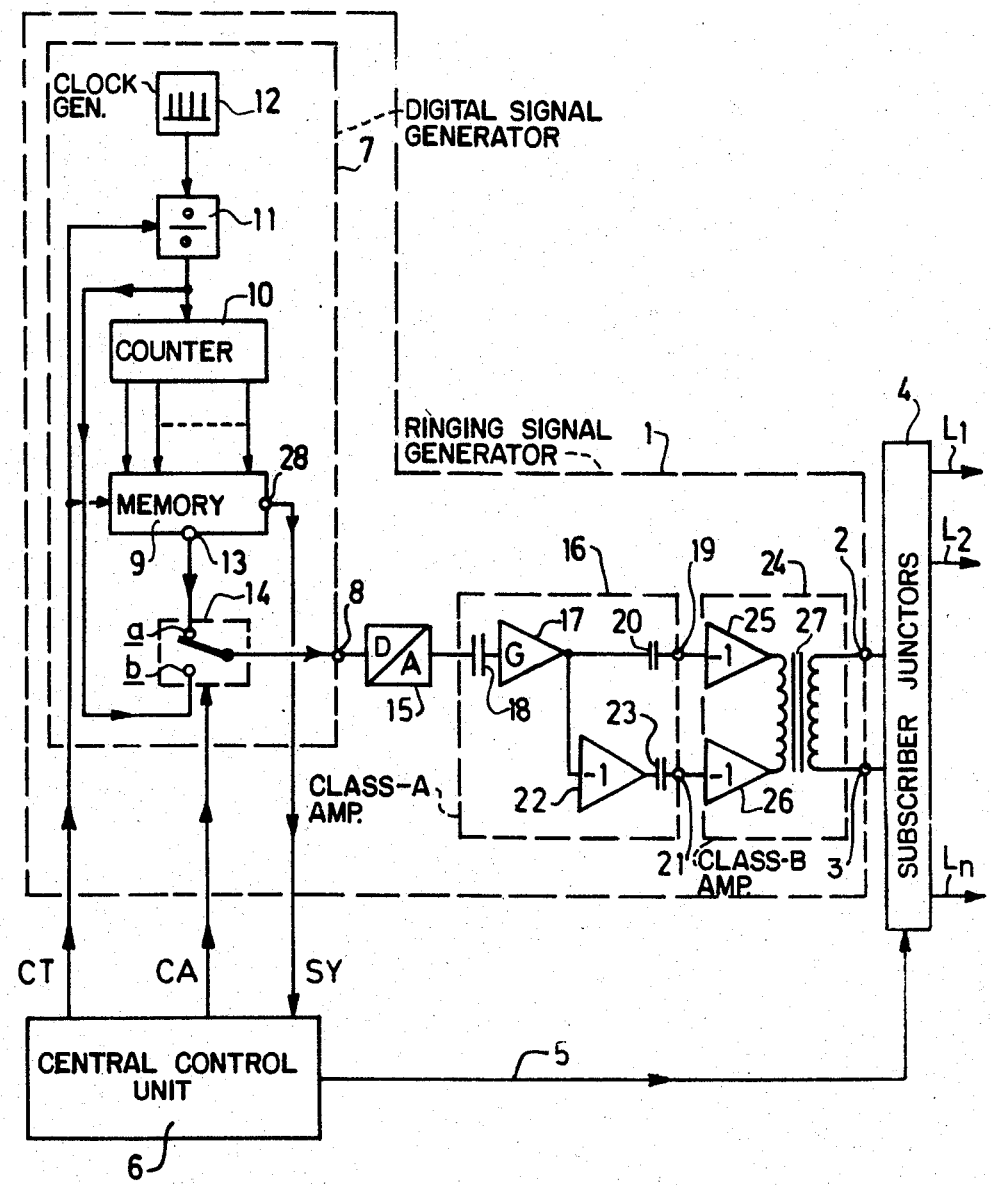

RINGING SIGNAL GENERATOR

The invention relates to a d.c.-fed ringing signal generator which is intended to produce the ringing signal for a group of subscriber lines, in a telephone exchange or in telephone subscriber sub-exchanges to feed the ringing signal to telephone lines, from a direct current source.

These generators must be capable of producing a signal having, for example, a frequency of 25 Hz or 50 Hz and a level of approximately 80 V, with a power which is sufficient to feed the ringing signal simultaneously to a number of telephone lines, depending on the subscriber traffic. On the other hand it is absolutely necessary that, when a generator is requested to supply ringing signal trains having, for example, in France a duration of 1.7 s and being separated by 3.3 s intervals, these trains are formed very rapidly.

Conventional converters for converting the d.c. voltage into a.c. voltage satisfy these requirements, provided they are allowed to function permanently in the same state, in such a way, that, when a telephone line is connected to the output of these converters, the ringing signal is immediately obtained. Actually, these converters which are, for example, formed by an oscillator operating at the frequency of the ringing signal, followed by a power amplifier stage cannot pass from a quiescent state to an operating state without a rather long settling time.

But on the other hand, these known converters dissipate a comparatively large amount of power in the idle state so that the ringing signal generators employing such converters, which permanently operate in the same state, consume much energy during the whole period of the time in which they need not produce any ringing signal. This is a particularly serious disadvantage for ringing signal generators included in subscriber line sub-stations carrying a low amount of traffic, as these stations must be supplied in certain cases by solar panels. The extent of this disadvantage will become apparent from the following example of the case of a station connected to 20 subscribers' lines with a traffic of 0.1 Erlang, which corresponds approximately to one call per subscriber and per hour, 18 hours out of 24. Let it be assumed that a subscriber call results in approximately 5 ringing signal trains, which approximately corresponds to 9 s of active ringing time. Assuming that a converter is used which dissipates, in the no-load condition, a power of 1.7 W, the energy consumed each day by the converter amounts substantially to: $24 \times 3600 \times 1.7 \; 10^{-3} \simeq 147$ K joules. This energy which is a pure loss must be compared to the useful energy necessary for the subscriber calls during a day. If the power of a ringing signal is 1.6 W (80 V, 20 mA) this useful energy amounts substantially to $1.6 \; 10^{-3} \times 9 \times 18 \times 20 \simeq 5.2$ K joules.

By means of the present invention it is possible to avoid this disadvantage by providing a ringing signal generator which can be set to a quiescent state in which it dissipates a small amount of power and can be set to the operating state in a very short time.

This generator whose concept is the same as that of the ringing signal generator disclosed in the Japanese Patent Specification No. 57-41068 (A) comprises a cascade arrangement of a digital ringing signal generator, a digital-to-analog converter and amplifier means; it differs from the Japanese patent in that, according to the invention, the said digital ringing signal generator is controllable by a control signal to produce in a very short time a digital signal which corresponds either to a ringing signal or to no ringing signal (hereinafter referred to as a zero signal) depending on whether a ringing signal or no ringing signal is to be produced for the group of subscriber lines, the said amplifier means comprising a capacitively-coupled class-A amplifier stage followed by a direct-coupled class-B amplifier stage, producing the output signal of the ringing signal generator.

With such a generator a settling time of the order of 10 ms has been obtained, which renders it possible to adjust this generator to a quiescent state when it need not to produce any ringing signals. For this quiescent state, the power dissipation is, for example, 70 mW, which corresponds to a daily energy consumption of $24 \times 3600 \times 0.070 \; 10^{-3} \simeq 6$ K joules, compared to 147 K joules for a conventional converter, as described in the above example.

The following description which is given by way of non-limitative example with reference to the accompanying drawing will make it better understood how the invention can be put into effect.

The sole FIGURE shows a circuit diagram of the ringing signal generator according to the invention.

The generator 1 shown in this FIGURE has for its object to supply, from a d.c. current source, not shown, a ringing signal for a certain number of subscriber lines $L_1$ to $L_n$. The output terminals 2, 3 of the generator 1 are connected to an assembly 4 of subscriber junctors, which are not shown individually. Each subscriber junctor comprises more specifically a ringing relay to transmit the ringing signal supplied by the generator 1 to one of the subscriber lines $L_1$ to $L_n$. Each ringing relay can be controlled at the rate of the ringing signal trains by a control signal appearing at the bus 5 and generated in a central control unit 6.

The ringing signal generator comprises a plurality of cascade-arranged elements and in the first place a digital signal generator 7 which is controlled by the control signal CA generated by the central unit 6, to supply at its output terminal 8 a digital signal corresponding either to the ringing signal or to a zero signal. When at least one of the ringing relays of the junctors of the assembly 4 is controlled to transmit the ringing signal to the lines $L_1$ to $L_n$, the control signal CA is such that a digital signal corresponding to the ringing signal appears at the terminal 8, and when none of the ringing relays is controlled to transmit the ringing signal the digital signal at the terminal 8 corresponds to a zero signal.

In the embodiment shown in the FIGURE, the digital signal generator 7 comprises a memory 9 in a memory location of which there are stored, for example, 256 PCM-encoded samples of a sinusoidal signal limited to one period. This memory is read by means of 256 addresses, which can be produced by a 8-bit counter 10. This counter 10 counts the pulses produced by the frequency divider 11 and is automatically reset to zero when it has reached its final position. The frequency divider 11 receives the pulses of a clock generator 12. In this way there is obtained at the output 13 of the memory 9 the digital, PCM-encoded version of a sinusoidal signal whose frequency depends particularly on the dividing factor of the frequency divider 11. This dividing factor can be changed to adapt the generator to the different, possible frequencies of the ringing signal, such as 50 Hz, 25 Hz or 16.33 Hz. If, for example, the clock frequency produced by the generator 12 is 2.048 MHz and if the dividing factor is 160, a digital signal corresponding to a 50 Hz sinusoidal signal, sampled 256 times per cycle, is obtained at the output 13 of the memory 9. On the other hand, the generator 7 comprises a switching circuit 14, which is controlled by the control signal CA originating from the central control unit 6, to be adjusted to the position a or to the position b. In the position a the output 13 of the memory 9 is connected to the output terminal 8 of the generator 7, which at this terminal 8 corresponds to the ringing signal. In the position b the output of the frequency divider 11, which supplies at a high frequency a sequence of bits which are alternately 1 and 0, is connected to the output terminal 8 of the generator 7, so that the digital version of a zero signal appears at this terminal 8.

The output terminal 8 of the digital signal generator 7 is connected to a digital-to-analog converter 15 which produces either an analog low-level ringing signal, chopped at the rate of the control signal CA, or an analog signal having substantially zero value. The output of the converter 15 responds differentially without delay to the control determined by the control signal CA.

To increase the level of the ringing signal, the output of the converter 15 is connected to an amplifier 16, which functions in class A and comprises coupling capacitors. This amplifier circuit 16 comprises an amplifier 17, which receives the input signal via a coupling capacitor 18 and which has a gain G which is sufficient to adjust the signal to the required level. The output of the amplifier 17 is connected to the output terminal 19 via the coupling capacitor 20 and also to the output terminal 21 via the amplifier 22 having a gain −1, and the coupling capacitor 23.

Two voltages with opposite phases suitable to control at an adequate level a power amplifier 24 of the push-pull type functioning in class B are obtained at the two output terminals 19 and 21 of the amplifier 16. This power amplifier is of the direct coupling type and comprises two amplifiers 25 and 26 having a gain −1, whose outputs are connected to two ends of the primary winding of the transformer 27. The secondary winding of this transformer is connected to the two outputs of the ringing signal generator. Generally, the transformer used has two identical secondary windings, which makes it possible, by an adequate polarization, to obtain the ringing signal in the form of two symmetrical voltages.

The coupling capacitors 18, 20 and 23 have for their object to avoid the transmission to the inputs of the power amplifier 24 of unavoidable offset voltages which may appear at the output of the converter 15 and at the output of the amplifiers 17 and 22. Thus, the power amplifier 24, which functions in class B, does substantially not consume energy when the generator 1 is in its quiescent state, that is to say when it is not requested to supply the ringing signal. The amplifier 16 which functions in class A and the digital signal generator 7 consume a very low amount of energy so that the overall ringing signal generator 1 has a very low power consumption in its quiescent state.

On the other hand, the coupling capacitors 18, 20 and 23 and further coupling capacitors which may be included in the amplifier elements 17 and 22, are charged by bias voltages determined by the operating point in class A of these elements and which consequently do not depend on the quiescent or operating states of the ringing signal generator. This results in these capacitors producing substantially no delay in the establishment of the ringing signal trains at the output of the amplifier 16. Finally, it is obvious that the direct-coupled power amplifier 24 no longer delays the establishment of the ringing signal trains at the output terminals 2 and 3 of the ringing signal generator.

Thanks to the above-described arrangements, a ringing signal generator is ultimately obtained which combines a low consumption in the quiescent state with a rapid settling time.

With this generator it is inter alia possible to prevent dangerous overvoltages being generated on the subscribers lines by cutting-off the ringing signal, by means of the ringing relays. For that purpose it is advantageous to provide the memory 9 with an output 28 for a synchronizing signal SY. This synchronizing signal SY is formed from pulses appearing with a fixed time shift, which may be equal to zero, relative to the instant at which the samples having zero value appear at the output 13 of the memory 9. This synchronizing signal SY may thus indicate in a precise manner the instants at which the a.c. ringing signal which appears at the output terminal 2, 3 of the generator is cancelled. The signal SY is applied to the central unit 6, which transmits the control signal for the ringing relays via the bus 5. Cutting-off the ringing relays is not permitted until the instant at which the pulses of the synchronizing signal SY occur, which prevents overvoltages on the subscriber lines.

The concept of the generator 1 according to the invention can easily cause it to perform a part other than generating the ringing signals. It may, for example, be used to generate low-frequency test signals in the telephone band. Signals of that type can be used for testing the subscriber lines or the subscriber junctors in accordance with, for example, the system described in the published French Patent Application No. 8105408.

To enable the generator 1 to produce an additional test signal, the memory 9 comprises an additional location for stocking the PCM samples of the desired test signal. For the transmission of a test signal, the central control unit 6 supplies a control signal CA to adjust the switching circuit 14 to the position a and a test control signal CT which shifts the addresses produced by the counter 9, to enable reading the samples of the test signal in the location of the memory 9 reserved for these samples. In certain applications it may be necessary to have the test control signal CT act such that it modifies the dividing factor of the frequency divider 11. The digital test signal obtained at the terminal 8 is applied to the converter 15 for conversion into an analog signal. This analog signal is amplified in the amplifiers 16 and 24 before being applied to the assembly 4 of subscriber junctors. In order to obtain the high-level ringing signal together with a low level analog test signal, with a high precision at the output of the generator, it may be advantageous for the samples of these two signals stored in the memory 9 to be encoded in compressed PCM, the digital-to-analog converter 15 then being of a type suitable for this type of coding.

What is claimed is:

1. A d.c. powered ringing signal generator for producing at its output ringing signals for a group of subscriber lines in a telephone exchange comprising a central control unit which produces control signals signifying whether a ringing signal or no ringing signal is to be produced for the group of subscriber lines, such ringing signal generator comprising:

a cascade arrangement of a digital signal generator, a digital-to-analog converter and amplifying circuit means;

said digital signal generator being controllable by said control signals to produce at its output a first digital signal when a control signal signifies that a ringing signal is to be produced and to produce at its output a second digital signal when a control signal signifies that no ringing signal is to be produced;

said digital-to-analog converter being connected to the output of said digital signal generator and being adapted to convert the digital signals produced thereby to analog signals corresponding thereto;

said amplifying circuit means being connected to the output of said digital-to-analog converter to receive said analog signals and comprising a glass-A amplifier stage followed by a direct-coupled class-B power amplifier stage; the class-B amplifier stage producing at its output a ringing signal when a received analog signal corresponds to said first digital signal and reverting to a quiescent state of low power consumption in which it produces no ringing signal when a received analog signal corresponds to said second digital signal; the output of the class-B amplifier stage being the output of the ringing signal generator.

2. A ringing signal generator as claimed in claim 1, wherein the digital signal generator is further adapted to produce at its output a synchronizing signal formed from pulses having a fixed time shift, which shift may have zero value, relative to the instants at which said first digital signal is terminated; such synchronizing signal being usable to allow termination of a ringing signal only at instants at which such synchronizing signal is produced.

3. A ringing signal generator as claimed in claim 1 which is furthermore adapted to produce a test signal for the said group of subscriber lines, and wherein the digital signal generator is moreover controllable by an additional control signal provided by the central control unit to produce, instead of said first digital signal, a third digital signal corresponding to such test signal.

4. A ringing signal generator as claimed in claim 1 wherein said first digital signals produced by said digital signal generator are encoded in compressed PCM so as to obtain a high dynamic level of the output of the ringing signal generator.

5. A ringing signal generator as claimed in claim 2 which is furthermore adapted to produce a test signal for the said group of subscriber lines, and wherein the digital signal generator is moreover controllable by an additional control signal provided by the central control unit to produce, instead of said first digital signal, a third digital signal corresponding to such test signal.

6. A ringing signal generator as claimed in claim 3 wherein said third digital signals produced by the said digital signal generator are encoded in compressed PCM so as to obtain a high dynamic level of the output of the ringing signal generator.

* * * * *